(12) United States Patent
Tanaka

(10) Patent No.: US 11,574,427 B2
(45) Date of Patent: Feb. 7, 2023

(54) DISPLAY CONTROL APPARATUS, DISPLAY CONTROL METHOD, AND RECORDING MEDIUM

(71) Applicant: CASIO COMPUTER CO., LTD., Tokyo (JP)

(72) Inventor: Toshiaki Tanaka, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/316,874

(22) Filed: May 11, 2021

(65) Prior Publication Data

US 2021/0264651 A1  Aug. 26, 2021

Related U.S. Application Data

(63) Continuation of application No. 16/245,421, filed on Jan. 11, 2019, now Pat. No. 11,017,570.

(30) Foreign Application Priority Data

Jan. 12, 2018  (JP) .............................. JP2018-003832

(51) Int. Cl.
*G06T 11/20* (2006.01)
*G06F 15/02* (2006.01)

(52) U.S. Cl.
CPC ............ *G06T 11/206* (2013.01); *G06F 15/02* (2013.01); *G06F 15/0225* (2013.01); *G06T 11/20* (2013.01)

(58) Field of Classification Search
CPC ........ G06T 11/206; G06T 11/20; G06F 15/02; G06F 15/0225
See application file for complete search history.

(56) References Cited

U.S. PATENT DOCUMENTS

| 5,712,656 A | 1/1998 | Ikeda et al. |
| 8,531,395 B2 | 9/2013 | Sawai et al. |
| 2010/0231596 A1* | 9/2010 | Matsuda ............. G06F 15/0225 345/440 |

FOREIGN PATENT DOCUMENTS

| CN | 104239267 A * 12/2014 ......... G06F 3/04847 |
| EP | 0 655 693 A1  5/1995 |

(Continued)

OTHER PUBLICATIONS

Summary Description of: (1) Scratch (programming learning support software program); and (2) "If on Edge, Bounce" code block available in Scratch, Retrieved from: htttps://scratch.mit.edu and https://www.youtube.com/watch?v=eORDWe7vxdU on Dec. 14, 2017.

(Continued)

*Primary Examiner* — Ryan R Yang
(74) *Attorney, Agent, or Firm* — Scully Scott Murphy & Presser

(57) ABSTRACT

A display control apparatus having: a processor configured to: read a predetermined command to control a display to draw a specific display object based on first coordinates within a coordinate system, wherein the predetermined command is part of a script of a plurality of commands to be read in order; determine whether the first coordinates satisfy a first condition, a second condition and a third condition; and control a display in response to a determination of whether the first coordinates satisfy the first condition, the second condition and the third condition.

14 Claims, 11 Drawing Sheets

(56) References Cited

FOREIGN PATENT DOCUMENTS

| JP | H08-50472 A | | 2/1996 | | |
|----|----|----|----|----|----|
| JP | H0850472 A | * | 2/1996 | ......... | G06F 15/0225 |
| JP | 2003-186852 A | | 7/2003 | | |
| JP | 2011-013839 A | | 1/2011 | | |
| JP | 2011-053827 A | | 3/2011 | | |

OTHER PUBLICATIONS

European Search Report dated Aug. 28, 2019 received in European Patent Application No. EP 19151507.1.

Kalinowski, E., "Programming in User RPL", retrieved from:https://www.thecalculatorstore.com/WebRoot/StoreES3/Shops/eb9376/4F66/65F1/F764/A6A0/BEE8/AC10/1417/5EA9/UserRPLTut.pdf on Aug. 19, 2019.

Texas Instruments, "TI-Basic Programming Guide for the TI-84 Plus CE Graphing Calculator", retrieved from: https://education.ti.com/-/media/377A0772C3B04D83B83D2A4E51029D08 on Aug. 15, 2019.

Office Action dated Apr. 13, 2020 received in U.S. Appl. No. 16/245,421.

Office Action dated Aug. 10, 2020 received in U.S. Appl. No. 16/245,421.

Notice of Allowance dated Jan. 27, 2021 received in U.S. Appl. No. 16/245,421.

Notice of Reasons for Refusal dated Oct. 26, 2021 received in Japanese Patent Application No. JP 2018-003832 together with an English language translation.

* cited by examiner

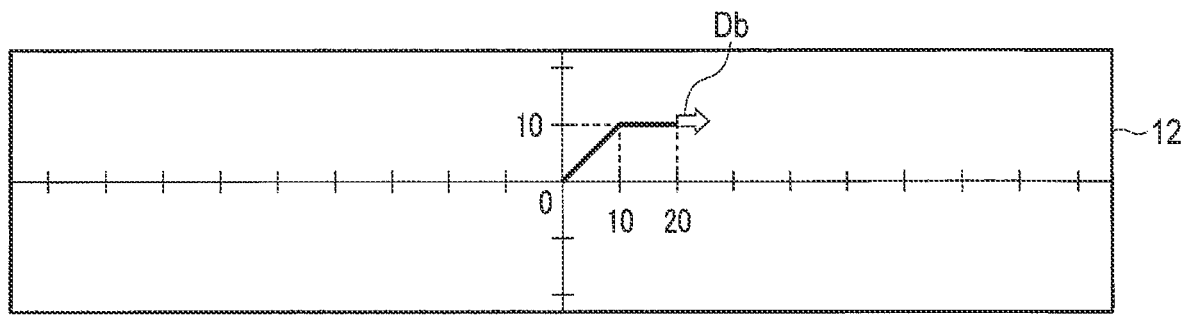
FIG. 6B
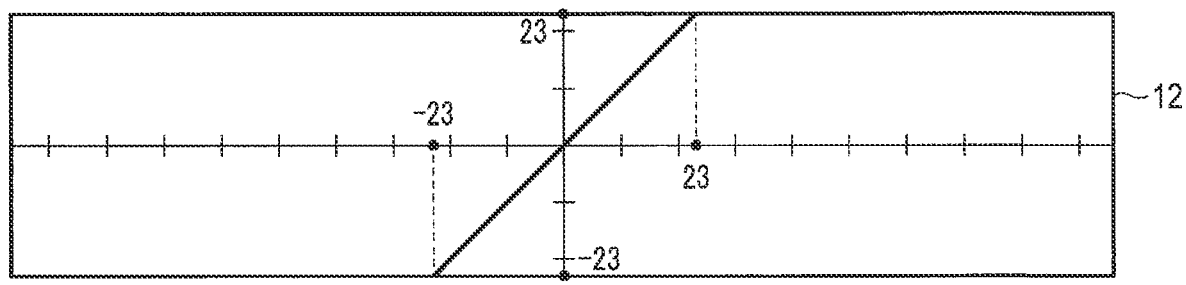
FIG. 7
```
A = 0      B = 0
C = 0      D = 0
E = 0      F = 0
M = 0      x = 20
y = 10     θ = 0
```
FIG. 8

```
A = 0        B = 0
C = 0        D = 0
E = 0        F = 0
M = 0        x = 100
y = OVER     θ = 0
```

FIG. 10

```
A = 0        B = 0
C = 0        D = 0
E = 0        F = 0
M = 0        x = UNDER
y = 100      θ = 0
```

FIG. 11

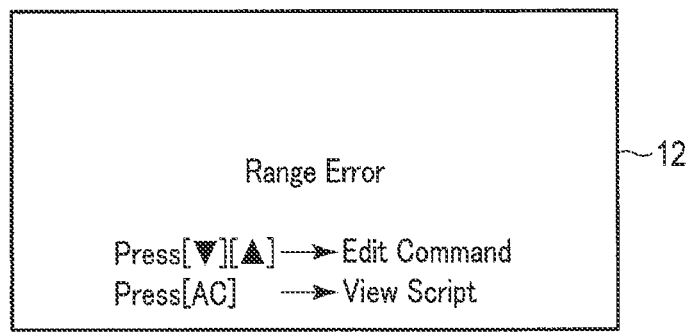
F I G. 12
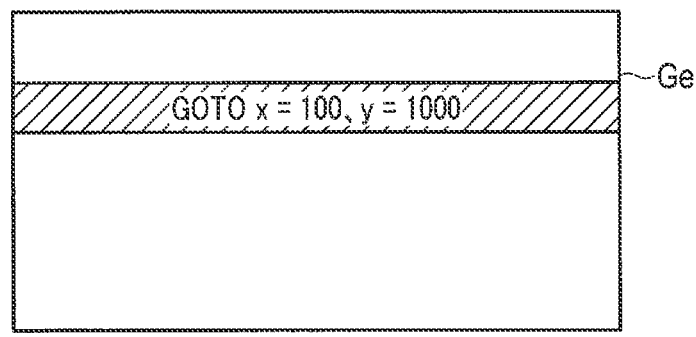
F I G. 13

DISPLAY CONTROL APPARATUS, DISPLAY CONTROL METHOD, AND RECORDING MEDIUM

CROSS-REFERENCE TO RELATED APPLICATIONS

This application is a continuation of U.S. application Ser. No. 16/245,421, filed Jan. 11, 2019 and claims priority to Japanese Patent Application No. 2018-003832, filed on Jan. 12, 2018, the entire contents of which are incorporated herein by reference.

BACKGROUND

1. Technical Field

The technical field relates to a display control apparatus, a display control method, and a recording medium.

2. Description of Related Art

In prior art, graph function electronic calculators are electronic calculators capable of performing drawing of a graph, calculation of simultaneous equations, and arithmetic operations using a variable. Graph function electronic calculators of this type include a display, and are capable of displaying a text of a plurality of lines and a graph serving as a calculation result on a display.

As described above, because graph function electronic calculators including a display, it is considered to use them for programing education in recent years.

When graph function electronic calculators are supposed to be used for programming education, it suffices that the graph function electronic calculators have an operation mode thereof configured to be switchable from a calculation mode to execute calculation to a mode (hereinafter referred to as "programming learning mode") to learn programming.

In the programming learning mode, for example, an avatar is displayed on the display, to move the avatar in accordance with a command input by the user or draw the locus of the avatar to cause the user to learn the algorithm. The term "avatar" herein means a display object displayed in a position corresponding to the coordinate values determined in accordance with the command in a coordinate system set on the picture displayed on the display. The avatar may be an image of a character, such as an animal, or an abstract image, such as an arrow and a dot.

By contrast, for example, Scratch published on the Internet (https://scratch.mit.edu/) (retrieved on Dec. 14, 2017) and the like is known as a programming learning support software program operating on a personal computer.

Generally, the coordinate values determined in accordance with the command may fall out of the display range of the coordinate system set on the picture.

In conventional programming learning support apparatuses, when the coordinate values corresponding to the display position of the avatar fall out of the display range of the coordinate system set on the picture, the avatar is displayed in a fixed state at the corner of the picture on which the coordinate system is set. For this reason, it is impossible to properly move the avatar in accordance with the input command.

The present invention has been made in consideration of such circumstances. An object of the present invention is to provide a display control apparatus, a display control method, and a recording medium capable of properly supporting user's programming learning.

SUMMARY

In one embodiment, a display control apparatus is provided. The display control apparatus comprises: a processor configured to: read a predetermined command to control a display to draw a specific display object based on first coordinates within a coordinate system, wherein the predetermined command is part of a script of a plurality of commands to be read in order; determine whether the first coordinates satisfy a first condition of the first coordinates being within a first range in the coordinate system, wherein the first range is within a display screen of the display; in response to determining that the first condition is satisfied, execute the predetermined command to control the display to draw the specific display object based on the first coordinates; determine whether the first coordinates satisfy a second condition of the first coordinates being outside of the first range and within a second range in the coordinate system, wherein the first range is within the second range; in response to determining that the second condition is satisfied, control the display to not execute the predetermined command; and determine whether the first coordinates satisfy a third condition of the first coordinates being outside of the second range; and in response to determining that the third condition is satisfied, control the display to not execute the predetermined command; control one or more of the display and an output device to output information indicating that the third condition is satisfied; and suspend reading of a next command in the script following the predetermined command.

In another embodiment, a method of controlling a display of a display control apparatus is provided. The method comprises: reading a predetermined command to control the display to draw a specific display object based on first coordinates within a coordinate system, wherein the predetermined command is part of a script of a plurality of commands to be read in order; determining whether the first coordinates satisfy a first condition of the first coordinates being within a first range in the coordinate system, wherein the first range is within a display screen of the display; in response to determining that the first condition is satisfied, executing the predetermined command to control the display to draw the specific display object based on the first coordinates; determining whether the first coordinates satisfy a second condition of the first coordinates being outside of the first range and within a second range in the coordinate system, wherein the first range is within the second range; in response to determining that the second condition is satisfied, controlling the display to not execute the predetermined command; determining whether the first coordinates satisfy a third condition of the first coordinates being outside of the second range; and in response to determining that the third condition is satisfied, controlling the display to not execute the predetermined command; controlling one or more of the display and an output device to output information indicating that the third condition is satisfied; and suspending reading of a next command in the script following the predetermined command.

In another embodiment, a non-transitory computer-readable storage device storing instructions that cause a computer control a display of a display control apparatus is provided. The instructions cause the computer to at least perform: reading a predetermined command to control the display to draw a specific display object based on first coordinates within a coordinate system, wherein the predetermined command is part of a script of a plurality of commands to be read in order; determining whether the first coordinates satisfy a first condition of the first coordinates being within a first range in the coordinate system, wherein the first range is within a display screen of the display; in response to determining that the first condition is satisfied, executing the predetermined command to control the display to draw the specific display object based on the first coordinates; determining whether the first coordinates satisfy a second condition of the first coordinates being outside of the first range and within a second range in the coordinate system, wherein the first range is within the second range; in response to determining that the second condition is satisfied, controlling the display to not execute the predetermined command; determining whether the first coordinates satisfy a third condition of the first coordinates being outside of the second range; and in response to determining that the third condition is satisfied, controlling the display to not execute the predetermined command; controlling one or more of the display and an output device to output information indicating that the third condition is satisfied; and suspending reading of a next command in the script following the predetermined command.

BRIEF DESCRIPTION OF THE DRAWINGS

FIG. 6B is a schematic diagram illustrating an example in which a drawn straight line is displayed on the display;

FIG. 7 is a schematic diagram illustrating an example in which a drawn straight line is displayed on the display;

FIG. 8 is a schematic diagram illustrating an example of parameters updated in accordance with coordinate values after movement of an avatar;

FIG. 9 is a schematic diagram illustrating another example of parameters updated in accordance with the coordinate values after movement;

FIG. 10 is a schematic diagram illustrating another example of parameters updated in accordance with the coordinate values after movement;

FIG. 11 is a schematic diagram illustrating another example of parameters updated in accordance with coordinate values after movement;

FIG. 12 is a schematic diagram illustrating a display example with the display in the case where the coordinates serving as a movement destination of the avatar exceed the operation range;

FIG. 13 is a diagram illustrating an example of a command edit picture;

DETAILED DESCRIPTION

Figure 1:
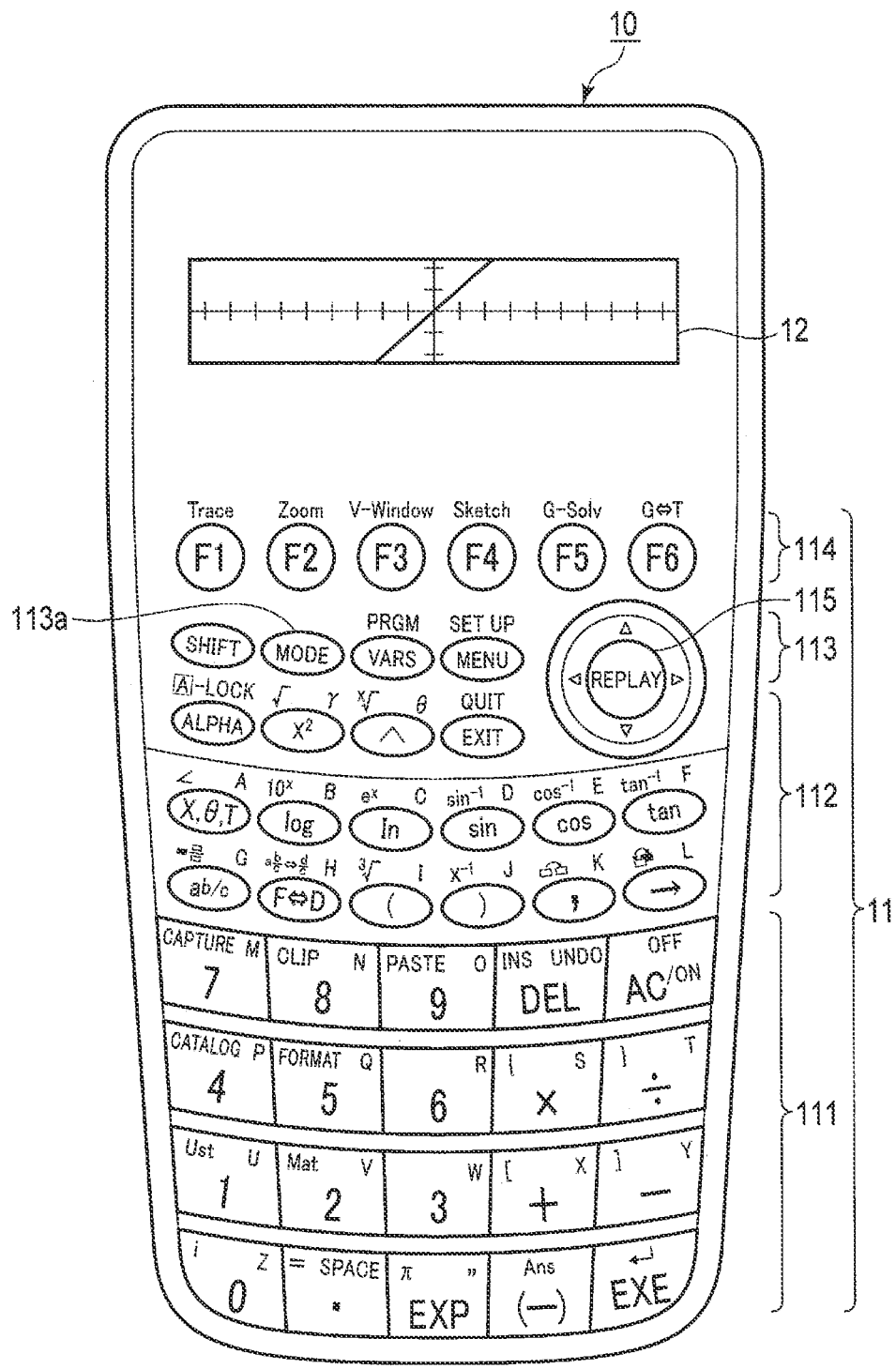
FIG. 1 is a front view illustrating an external structure of an electronic apparatus equipped with a display control apparatus to which a display control method is applied according to an embodiment of the present invention.

FIG. 1 is a front view illustrating an external structure of an electronic apparatus 1 equipped with a display control apparatus to which a display control method is applied according to an embodiment of the present invention.

FIG. 1 is a diagram illustrating the case where the electronic apparatus 10 is realized as a graph function electronic calculator. However, the electronic apparatus 10 is not limited to the case of being configured as a graph function electronic calculator, but may be configured as a tablet terminal, a personal computer, a smartphone, a mobile phone, a touch panel PDA (personal digital assistants), an electronic book, or a portable game machine, or the like.

An electronic apparatus (not illustrated), such as a tablet terminal, that is not provided with physical keys (buttons) provided in a graph function electronic calculator displays a software keyboard similar to keys of a graph function electronic calculator, to execute processing in accordance with key operations on the software keyboard.

The electronic apparatus 10 configured as a graph function electronic calculator has a small size enough to enable the user to hold and operate the electronic apparatus 10 by one hand for the necessity of its portability. The front surface of the main member of the electronic apparatus 10 is provided with a key input unit 11 and a display 12.

The key input unit 11 is provided with numerical value/arithmetic operation symbol keys 111 to input numerical values, numerical expressions, and program commands and command calculation and/or execution of a program, functional function keys 112 to input various functions and start a memory function, setting keys 113 including a mode selection key "MODE" to display menu pictures of various operation modes, such as a calculation mode and a programming learning mode, and command setting of these operation modes, a function keys 114 to start various functions displayed along the lower end of the display 12 by one key operation, and a cursor key 115 to perform an operation of moving the cursor displayed on the display 12 and/or an operation of selecting an data item.

Keys arranged as the numerical value/arithmetic operation symbol keys 111 include keys [0] to [9] (numerical values), keys [+], [−], [×], and [÷] (the four arithmetic operation symbols), a key [EXE] (execution), and a key [AC] (clear), and the like.

Keys arranged as the functional function keys 112 include a key [sin] (sine), a key [cos] (cosine), and a key [tan] (tangent), and the like.

Keys arranged as the setting keys 113 include a key [MENU] (menu), and a key [SHIFT] (shift), as well as the mode selection key [MODE].

Keys [F1] to [F6] are arranged as the function keys 114.

The keys of the numerical value/arithmetic operation symbol keys 111, the functional function keys 112, the setting keys 113, and the function keys 114 are configured to function as keys of functions described above the keys, not the key functions described on the key tops, by being operated successively after the key [SHIFT] is operated. For example, when the key [AC] is operated after the key [SHIFT] is operated (hereinafter referred to as "keys [SHIFT]+[AC]"), the key function as the key [OFF] (power off). The keys [SHIFT]+[MENU] function as the key [SET UP] (set up), and the keys [SHIFT]+[F3] function as the key [V-Window] (view window: commanding display of a drawing region setting picture).

The display 12 is formed of a liquid crystal display unit of a dot-matrix type. When the electronic apparatus 10 is a tablet terminal, the display 12 is formed of a liquid crystal display unit on which a touch panel is superimposed.

Figure 2:
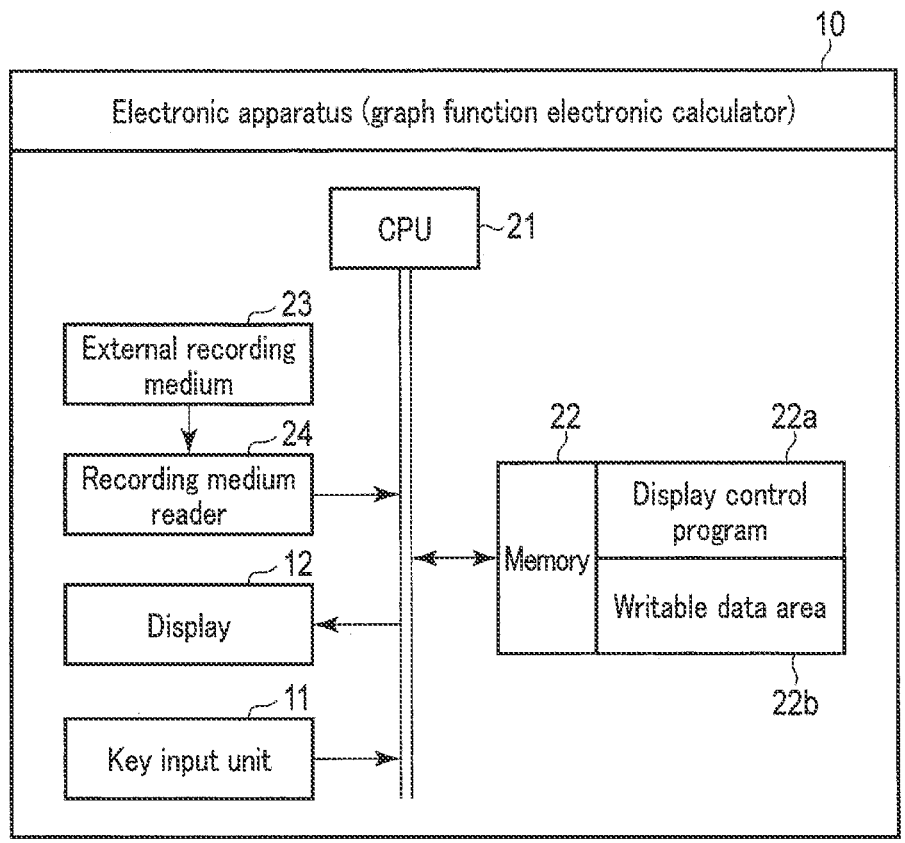
FIG. 2 is a block diagram illustrating a configuration of an electronic circuit of the electronic apparatus.

FIG. 2 is a block diagram illustrating a configuration of an electronic circuit of the electronic apparatus 10.

The electronic circuit of the electronic apparatus 10 includes a CPU 21 serving as a computer, a memory 22, and a recording medium reader 24, in addition to the key input unit 11 and the display 12.

The CPU 21 controls operations of each of units of the circuit in accordance with a display control program 22a stored in the memory 22, and executes various types of processing corresponding to key input signals transmitted from the key input unit 11. The display control program 22a may be stored in the memory 22 in advance, or read into the memory 22 from an external recording medium 23, such as a memory card, through the recording medium reader 24 and stored in the memory 22. The display control program 22a is configured to be non-rewritable by a user's operation of the key input unit 11.

The memory 22 includes a writable data area 22b secured therein, as an area to store rewritable data by the user. The writable data area 22 serves as an area to which pieces of data of key codes input by key operations with the key input unit 11 are successively input to store data of numerical expressions, table data, and graph data and the like formed of the input data.

In the electronic apparatus 10 formed as described above, the CPU 21 controls operations of each of units of the circuit in accordance with the command described in the display control program 22a, and the software and the hardware operate in cooperation to achieve a display control function as explained below.

Specifically, the display control program 22a is a program to display an avatar (display object) Db and a locus of the avatar Db through the display 12 in the programming learning mode. The display control program 22a displays the locus of the avatar Db through the display 12, even when the avatar Db falls out of the display range (range B in FIG. 4 described later) of the display 12.

The electronic apparatus 10 is set to the programming mode by pressing a "MODE" key 113a in the setting keys 113. Specifically, the electronic apparatus 10 includes various operation modes, such as the calculation mode and the programming learning mode, and the calculation mode and the programming learning mode are alternately switched when the "MODE" key 113a is pressed. The electronic apparatus 10 may include a mode other than the modes described above. Even when the electronic apparatus 10 includes three or more modes, the structure can be achieved by configuring the modes successively switchable each time the "MODE" key 113a is pressed.

Figure 3:
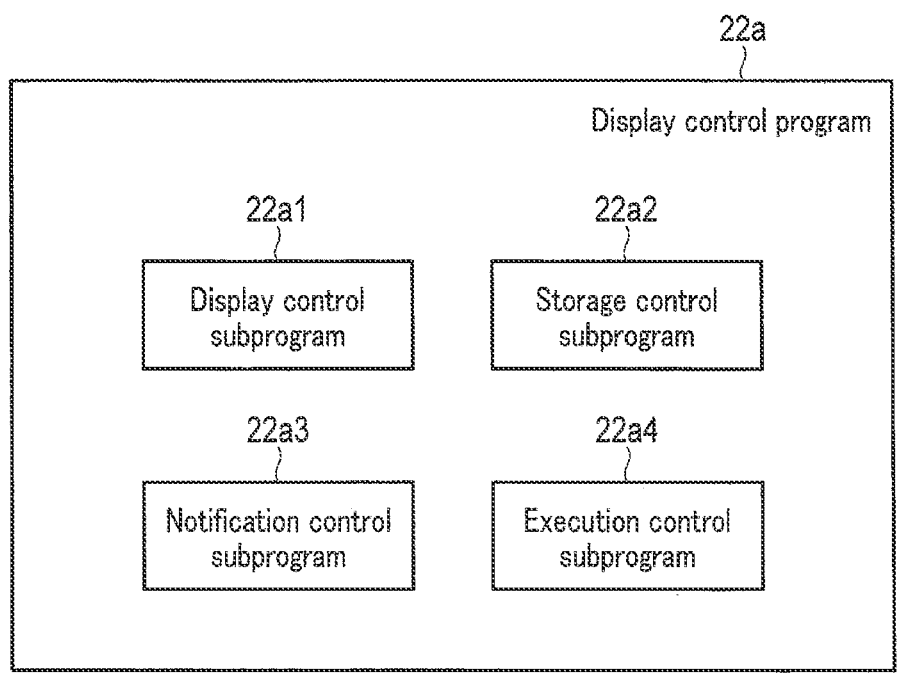
FIG. 3 is a block diagram illustrating subprograms included in a display control program.

FIG. 3 is a block diagram illustrating subprograms included in the display control program 22a.

As illustrated in FIG. 3, the display control program 22a includes a display control subprogram 22a1, a storage control subprogram 22a2, a notification control subprogram 22a3, and an execution control subprogram 22a4.

When the mode is set to the programming learning mode, the electronic apparatus 10 comes to the state in which the display control program 22a is capable of receiving a command from the numerical value/arithmetic operation symbol keys 111.

In response to it, the user is enabled to input various commands by operating the numerical value/arithmetic operation symbol keys 111, to prepare and edit a script. The term "script" herein means a program list including at least one command. Each command included in the script means a command of a minimum unit that can be selected and input on a script edit picture in the programming learning mode of the electronic apparatus 10 according to the present embodiment. The following is a specific explanation of commands with a script illustrated as an example.

The following is an example (Example 1) of a script formed of three commands.

Example 1

PEN DOWN
GOTO x=10, y=10
MOVE (10)
PEN UP

The command "PEN DOWN" is a command commanding drawing of a locus of the avatar Db, and the command "PEN UP" is a command commanding drawing no locus of the avatar Db. The command "GOTO" is a command commanding movement to the designated absolute coordinates, and the command "MOVE" is a command to designate relative movement quantity from the current position of the avatar Db. The direction of movement of the avatar Db when the command "MOVE" is executed will be designated separately as described later.

In the electronic apparatus 10, a coordinate range that can be dealt with is finite. In the present specification, the coordinate range that can be dealt with the graph function electronic calculator is referred to as "operation range". The electronic apparatus 10 is not capable of dealing with coordinate values exceeding the operation range, but deals with such coordinate values as overflow. The electronic apparatus 10 is capable of displaying only part of coordinate range in the operation range through the display 12. In the present specification, the coordinate range that the electronic apparatus 10 is capable of displaying through the display 12 is referred to as "display range".

Figure 4:
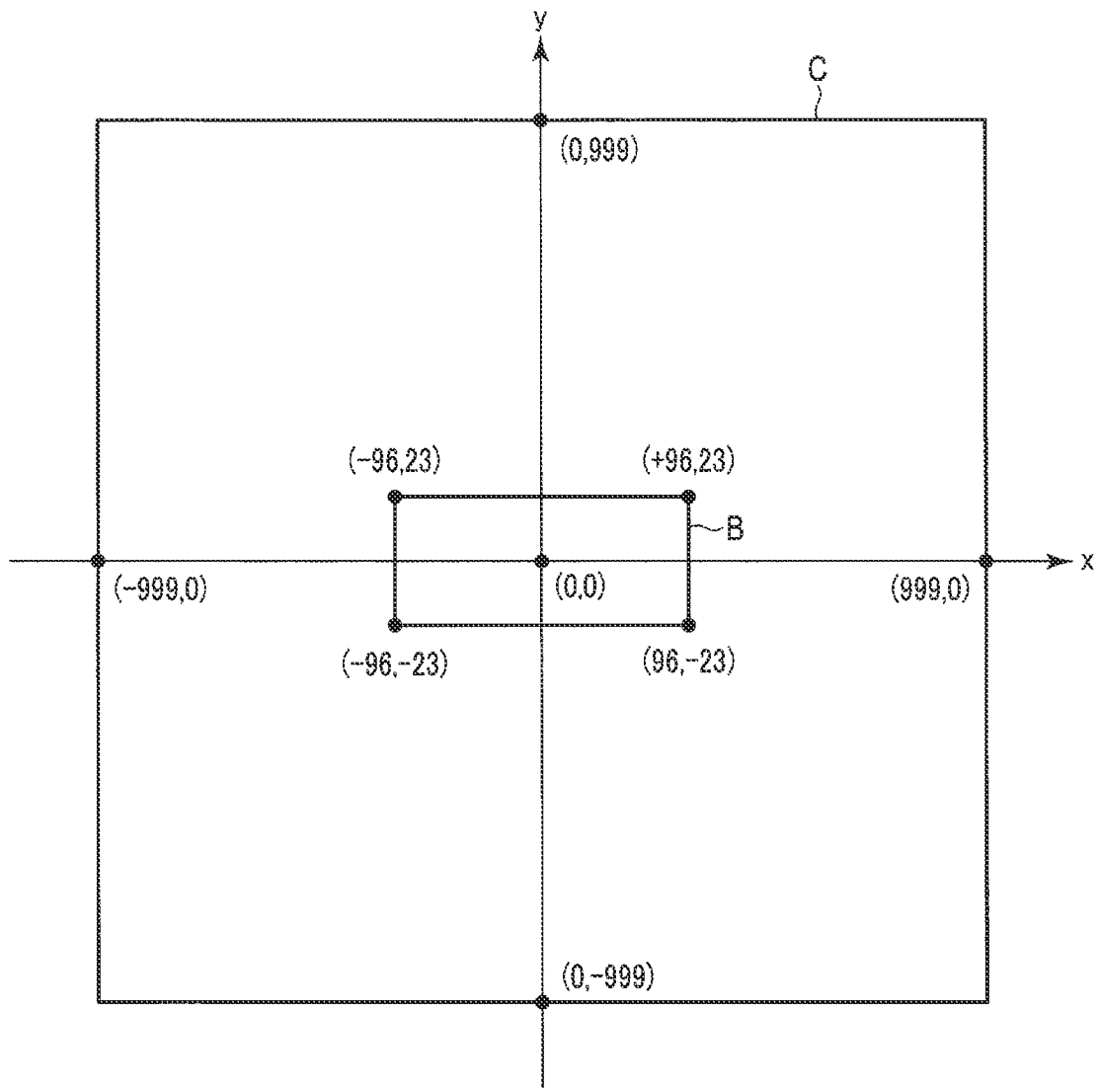
FIG. 4 is a schematic diagram illustrating relation between a display range and an operation range.

FIG. 4 is a schematic diagram illustrating relation between the display range and the operation range.

Both the display range (first range) B and the operation range (second range) C are defined with the xy coordinate system. The display range B satisfies "xminb≤x≤xmaxb" and "yminb≤y≤ymaxb" in the xy coordinates, and the operation range C satisfies "xminc≤x≤xmaxc" and "yminc≤y≤ymaxc" in the xy coordinates. As an example, the display range B satisfies "−96≤x≤96" and "−23≤y≤23" in the xy coordinates, and the operation range C satisfies "−999≤x≤999" and "−999≤y≤999" in the xy coordinates.

The display control subprogram 22a1 checks the type of the command and whether the command "PEN DOWN" is effective in the input script, to recognize that the command "PEN DOWN" is effective and the script includes the command "GOTO" or the command "MOVE". In addition, when movement of the avatar Db designated with the command "GOTO" or the command "MOVE" is made in the display range B, the display control subprogram 22a1 displays the locus of the avatar Db through the display 12.

By contrast, when the command "PEN DOWN" is effective and movement of the avatar Db is made within the operation range C even when the movement exceeds the display range B, the display control subprogram 22a1 hides the avatar Db on the display 12, and displays a straight line connecting the coordinates before movement with coordinates after movement, that is, the part belonging to the display range B in the locus of the avatar Db through the display 12.

Specifically, the display control subprogram 22a1 determines whether both the coordinates of the avatar Db before movement and the coordinates thereof after movement fall within the operation range C and whether they fall within the display range B. In addition, when the display control program 22a1 determines that both the coordinates of the avatar Db before movement and the coordinates thereof after movement fall within the operation range C and fall out of the display range B, the display control subprogram 22a1 calculates two coordinates at which the straight line connecting the coordinates before movement with coordinates after movement crosses the boundary of the display range B, with the avatar Db hidden, and displays a straight line connecting the two calculated coordinates through the display 12.

By contrast, when at least one of the coordinates of the avatar Db before movement and the coordinates thereof after movement falls within the display range B and the other falls within the operation range C and falls out of the display range B, the display control subprogram 22a1 calculates one coordinates at which the straight line connecting the coordinates before movement with coordinates after movement crosses the boundary of the display range B, and displays the calculated coordinates and the straight line connecting the coordinates before movement or the coordinates after movement in the display range B through the display 12. Because at least one of the coordinates of the avatar Db before movement and the coordinates thereof after movement falls within the display range B, the avatar Db is displayed at the one coordinates through the display 12.

The display control subprogram 22a1 also updates the coordinate values of the avatar Db to the coordinate values after movement, and displays the updated coordinate values through the display 12. When one of the x coordinate value and the y coordinate value of the avatar Db after movement falls out of the operation range C and the electronic apparatus 10 is not capable of dealing with the overflowing coordinate value falling out of the operation range C due to overflow, the display control subprogram 22a1 updates the overflowing coordinate value to error information (for example, characters "OVER"). For example, when the coordinates (x, y) of the avatar Db after movement are (100, 1000), the display control subprogram 22a1 updates the coordinate values to "x=100, y=OVER", and displays the values through the display 12.

The storage control subprogram 22a2 stores the values of the moved coordinates (x, y) of the avatar Db updated with the display control subprogram 22a1 in the writable data area 22b. Even when the coordinate values are updated to, for example, "x=100, y=OVER" due to overflow, the storage control subprogram 22a2 stores the coordinate values in the writable data area 22b.

In addition, when the coordinates of the avatar Db after movement satisfy the overflow condition that the coordinates do not belong to the operation range C, the notification control subprogram 22a3 notifies the user that the coordinates satisfy the overflow condition. Examples of the notification method may include display of character information (such as "Range Error") through the display 12 and output of sound information, such as beep and voice guidance, through speakers (not illustrated).

When the overflow condition is satisfied, the execution control program 22a4 performs control to prevent execution of processing of the subsequent commands in the script.

The following is an explanation of operations of the electronic apparatus 10 according to the embodiment of the present invention configured as described above, with reference to flowcharts illustrated in FIG. 5A to FIG. 5E.

Figure 5A:
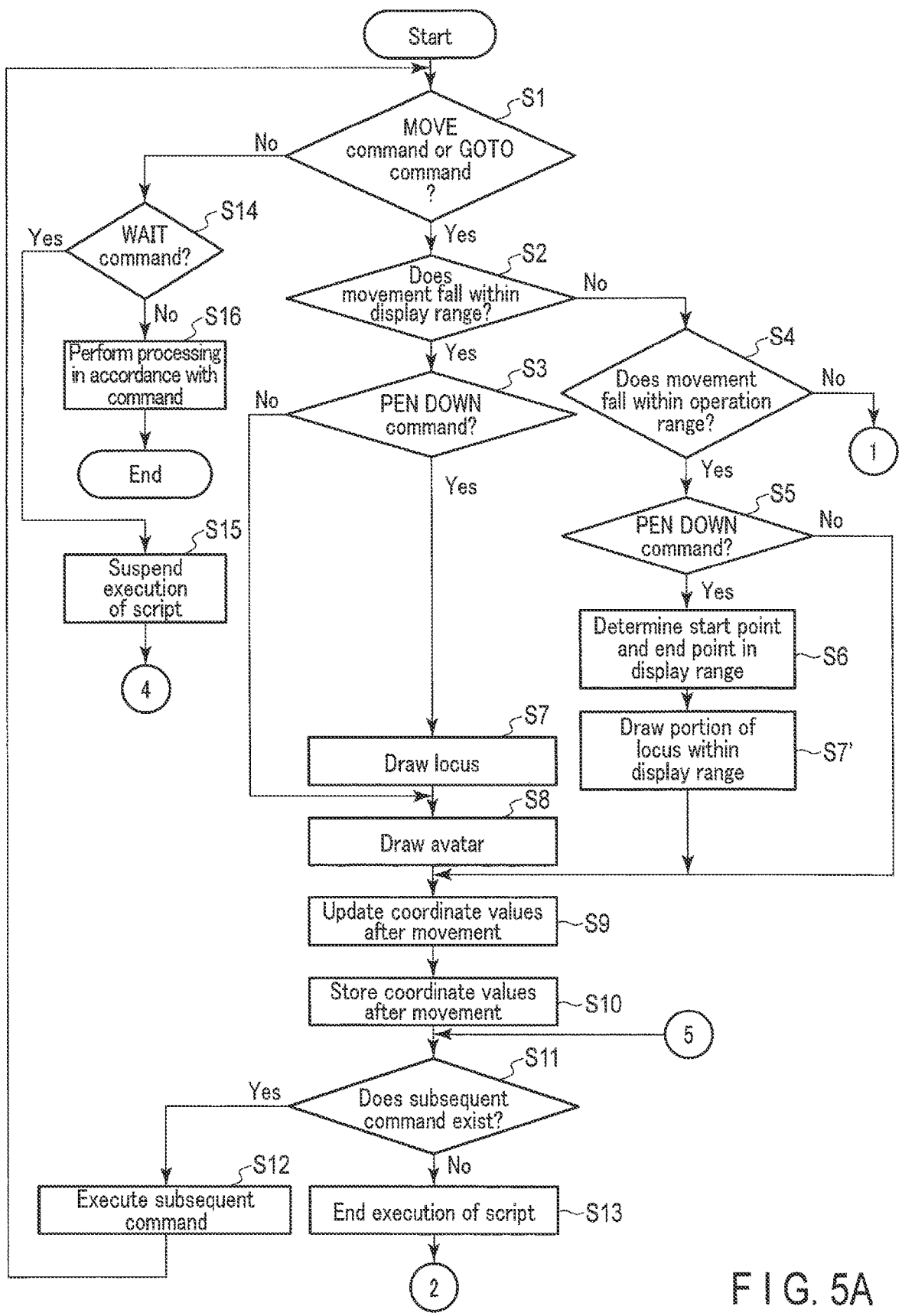
FIG. 5A is a flowchart illustrating an operation example of an electronic apparatus 10 according to an embodiment of the present invention.
Figure 5B:
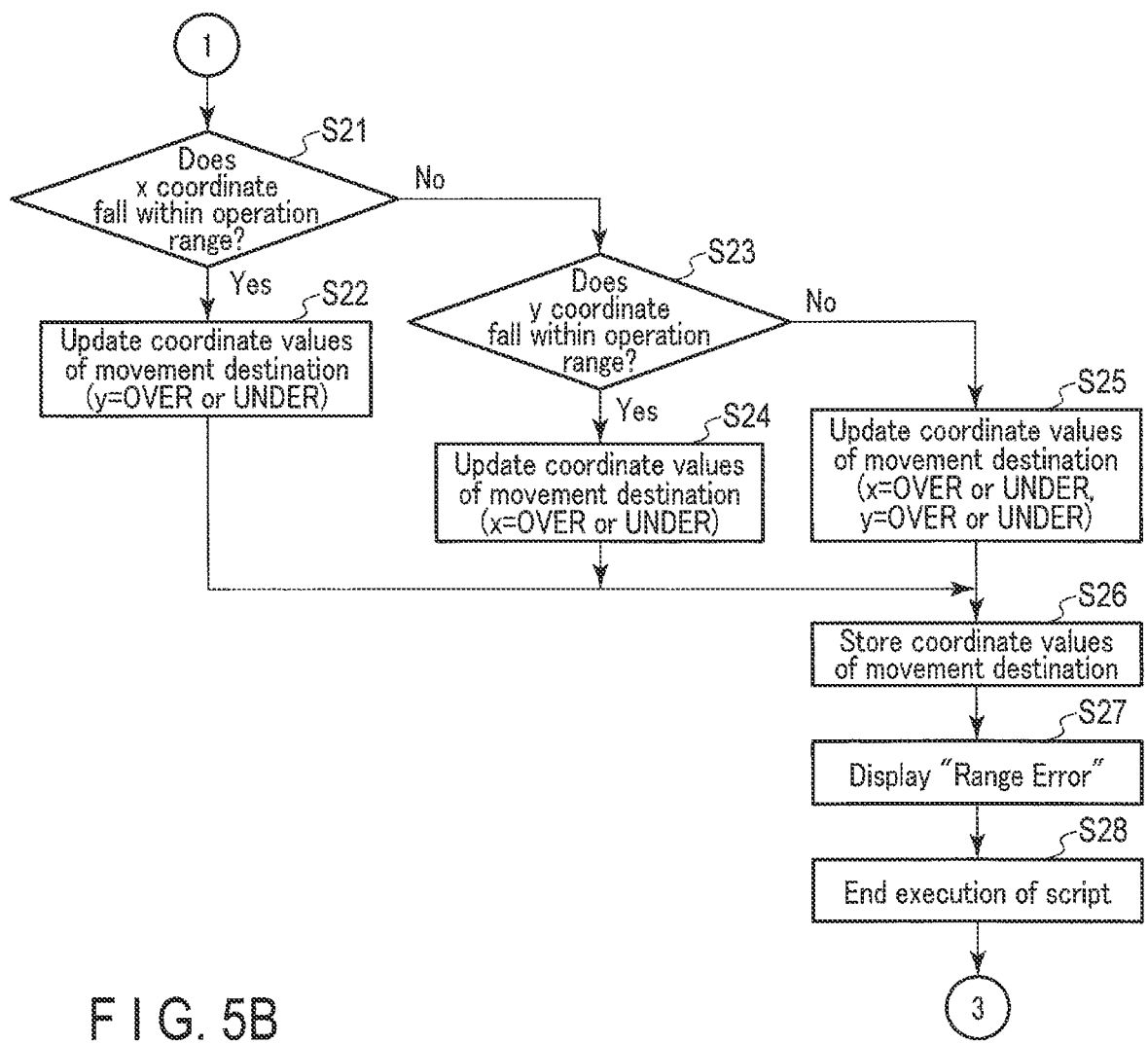
FIG. 5B is a flowchart illustrating an operation example of the electronic apparatus 10 according to the embodiment of the present invention.

For example, a script like Example 1 is input by the user, the display control program 22a successively reads the script from the first line to the last line, and the processes illustrated in FIG. 5A and FIG. 5B are executed whenever each line is read.

First, the command "PEN DOWN" in the first line is read, and it is recognized whether the type of the read command is a command "GOTO" or a command "MOVE" (S1). For example, in the case where the script is a script like Example 1, it is determined that the first line is neither a command "GOTO" nor a command "MOVE" (No at S1).

In addition, it is recognized whether the type of the read command is a command "WAIT" (S14). In the same manner, when the script is a script like Example 1, it is determined that the first line is not a command "WAIT" (No at S14). At Step S14, when the type of the read command is a command "WAIT" (Yes at S14), execution of the script is suspended (S15). The processing performed after execution of the script is suspended will be described later.

After it is determined that the read command is not a command "WAIT", processing corresponding to the command is performed (S16), and the apparatus is changed to a state in which the command "PEN DOWN" is effective. Whether the command "PEN DOWN" is effective is temporarily stored in the writable data area 22b of the memory 22.

Thereafter, the command "GOTO x=10, y=10" in the second line is read, and it is recognized whether the type of the read command is a command "GOTO" or a command "MOVE" (S1). For example, in the case of the script like Example 1, it is determined that the second line includes a command "GOTO" (Yes at S1).

When it is determined that the script includes a command "GOTO" or a command "MOVE" (Yes at S1), the display control program 22a determines whether the movement is made within the display range B, that is, both the coordinates before and after movement of the avatar Db fall within the display range B, on the basis of the coordinates before and after movement of the avatar Db (S2). In the case of Example 1, the command display control program 22a determines that movement of the avatar Db is made within the display range B, that is, the first condition is satisfied, on the basis of the coordinates before movement, that is, the initial position coordinates (0, 0) of the avatar Db and the coordinates (10, 10) serving as the movement destination (Yes at S2).

When it is determined that movement of the avatar Db is made within the display range B (Yes at S2), the display control program 22a reads a specific region of the writable data area 22b of the memory 22, to determine whether the command "PEN DOWN" is effective (S3). In the case of Example 1, it is determined that the command "PEN DOWN" is effective at the time when the command "GOTO" in the second line is read (Yes at S3).

Figure 6A:
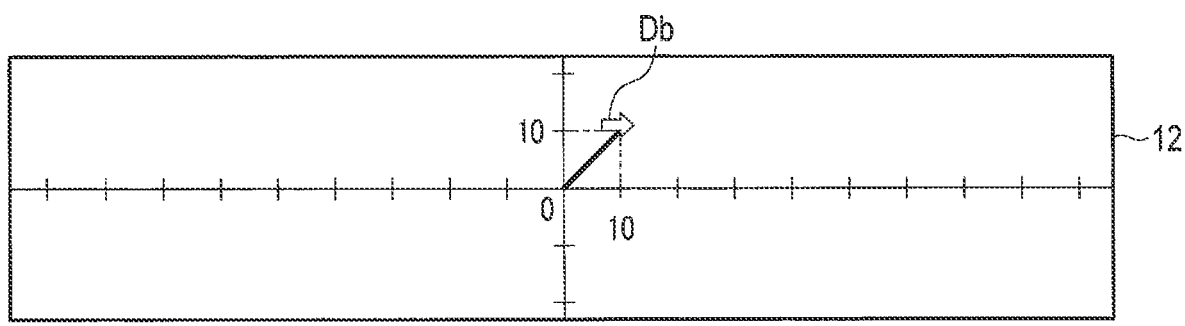
FIG. 6A is a schematic diagram illustrating an example in which a drawn straight line is displayed on a display.

When the display control program 22a determines that the command "PEN DOWN" in the script is effective (Yes at S3), a straight line is drawn to illustrate a locus of the avatar Db from the coordinates before movement to the coordinates after movement in the display range B, and a part falling within the display range B in the drawn locus is displayed through the display 12 (S7). FIG. 6A is a schematic diagram illustrating an example in which the drawn locus is displayed through the display 12 in the case where the coordinates before movement are (0, 0) and the coordinates after movement are (10, 10). Thereafter, Step S7 is executed with the display control program 22a, and the avatar Db is displayed at the coordinates serving as the movement destination through the display 12, as illustrated in FIG. 6A (S8).

After Step S8, the display control program 22a updates (S9) the values of the coordinates (x, y) of the avatar Db after movement, and the storage control subprogram 22a2 stores the updated values in the writable data area 22b (S10).

After Step S10, it is determined whether any subsequent command to be executed exists (S11). Because a subsequent command exists in this example (Yes at S11), the process proceeds to the processing to read the subsequent command (S12), and thereafter returns to Step S1. When no subsequent command exists (No at Step S11), execution of the script is ended (S13), with the avatar Db kept displayed through the display 12. The operation after execution of the script is ended will be described later.

By contrast, at Step S3, also when it is determined that the command "PEN DOWN" is not effective in the script (No at S3), the process proceeds to the processing at S8 to S13 described above.

Thereafter, the command "MOVE (10)" in the third line is read, and it is recognized that the type of the read command is "MOVE" (Yes at S1). The display control program 22a reads a specific region of the writable data area 22b of the memory 22, and the direction "θ=0" of movement of the avatar Db is acquired. The symbol "θ" indicates a numerical value indicating the angle at the polar coordinates with the origin serving as the center, and the positive direction of the x axis serves as the reference angle "0°". For this reason, in the case of "θ=0", the avatar Db is moved along the positive direction of the x axis with the display control program 22a.

In addition, in the same manner as the command processing for the second line, the display control program 22a determines that the movement is made within the display range B (Yes at S2), on the basis of the coordinates before and after movement of the avatar Db. The display control program 22a reads a specific region of the writable data area 22b of the memory 22, and determines that the command "PEN DOWN" is effective (Yes at S3). Thereafter, a straight line indicating the locus of the avatar Db from the coordinates before movement in the display range B to the coordinates serving as the movement destination, and the part falling within the display range B in the drawn locus is displayed through the display 12 (S7).

FIG. 6B is a schematic diagram illustrating an example in which the drawn locus is displayed through the display 12 when the coordinates before movement are (10, 10) and the coordinates serving as the movement destination are (20, 10). The display control program 22a executes Step S7, and the avatar Db is displayed at the coordinates serving as the movement destination through the display 12 (S8), as illustrated in FIG. 6B.

After Step S8, the display control program 22a updates the values of the coordinates (x, y) of the avatar Db after movement (S9), and the storage control subprogram 22a2 stores the updated values in the writable data area 22b (S10). After Step S9, it is determined whether any subsequent command to be executed exists (S11). Because the subsequent command exists in this example (Yes at S11), the process proceeds to the processing to execute the subsequent command (S12), and thereafter returns to Step S1.

Thereafter, the command "PEN UP" in the fourth line is read, and it is determined that the type of the read command is neither a command "GOTO" nor a command "MOVE" (No at S1). Thereafter, the process proceeds to Step S14, and it is determined that the command is not a command "WAIT", either (No at S14). Thereafter, the process in accordance with the command is executed (S18), and the command "PEN DOWN" is changed to an ineffective state. Information that the command "PEN DOWN" is ineffective is temporarily stored in the writable data area 22b of the memory 22. As described above, execution of the script like Example 1 is ended.

The following is an explanation of operations of the electronic apparatus 10 in the case where the following script (Example 2) is processed. An explanation of the part similar to that in Example 1 described above will be omitted.

Example 2

PEN DOWN
GOTO x=−100, y=−100
GOTO x=100, y=100

Also in the case of Example 2, the display control program 22a determines that the script includes a command "GOTO" (Yes at S1). However, it is determined that the coordinates (100, 100) serving as the movement destination of the avatar Db exceeds the display range B (No at S2).

When it is determined that the coordinates serving as the movement destination of the avatar Db exceeds the display range B (No at S2), the display control program 22a determines whether the coordinates of the movement destination of the avatar Db falls within the operation range C (S4). In the case of Example 2, the coordinates (100, 100) of the movement destination of the avatar Db falls within the operation range C, that is, it is determined that the second condition is satisfied (Yes at S4).

When it is determined that the coordinates serving as the movement destination of the avatar Db falls within the operation range C (Yes at S4), the display control program 22a determines whether the command "PEN DOWN" is effective in the script (S5). In the case of Example 2, it is determined that the command "PEN DOWN" is effective in the script (Yes at S5).

When the command "PEN DOWN" is effective in the script (Yes at S5), the display control program 22a determines the start point coordinates of the avatar Db and the end point coordinates in the display range B as follows (S6).

Generally, a straight line (hereinafter referred to as "locus straight line") connecting two points of the coordinates (x1, y1) of the avatar Db before movement and the coordinates (x2, y2) after movement is indicated with the expression "y=m (x−x1)+y1" when m indicates the inclination. The expression "m=(y2−y1)/(x2−x1)" is satisfied. The expression is used with the display control subprogram 22a1. When the value of the inclination m is positive or negative, the following calculations are performed: (1) calculation of coordinates (x (ymaxb), ymaxb) serving as an intersection point of a straight line "y=ymaxb" (y=23 in the example of FIG. 7, the same is applicable hereinafter) indicating the upper side of the display range B and the locus straight line; and (2) calculation of coordinates (x (yminb), yminb) serving as an intersection point of a straight line "y=yminb" (y=−23) indicating the lower side of the display range B and the locus straight line.

In addition, in accordance with results of determination of "xminb<x (ymaxb)<xmaxb" and "xminb<x (yminb) <xmaxb", it is determined with which two sides of four sides of the display range B the locus straight line has an intersection point, and coordinates of two intersection points between the locus straight line and the two sides including the intersection points are calculated. When the value of the inclination m is 0, two intersection points of xmaxb and xminb and the locus straight line are determined. When the value of the inclination m is «), two intersection points of ymaxb and yminb and the locus straight line are determined. The symbol "x (ymaxb)" indicates the value of x in the case of ymaxb, and the symbol "y (xmaxb)" indicates the value of y in the case of xmaxb.

In the case of Example 2, because the coordinates before movement are (−100, −100) and the coordinates serving as the movement destination are (100, 100), "x=23" is calculated as the intersection point with "ymaxb=y=23" in item (1), and "x=−23" is calculated as the intersection point with "yminb=y=−23". The coordinates (−23, −23) and (23, 23) of the two intersection points acquired as described above are determined as the start point coordinates and the end point coordinates in the display range B.

After the processing at Step S6, the display control program 22a draws a straight line from the start point coordinates to the end point coordinates determined at Step S6, and displayed as the locus of the avatar Db through the display 12 (S7'). FIG. 7 is a schematic diagram illustrating an example in which the straight line drawn in the case where the start point coordinates are (−23, −23) and the end point coordinates are (23, 23) is displayed through the display 12.

As described above, even in the case where the avatar Db falls out of the display range B, the locus of the avatar Db that falls within the display range B is displayed through the display 12. Drawing of the locus is executed by connecting the two points of the start point coordinates and the end point coordinates with a straight line using a drawing function of the operating system installed in the electronic apparatus 10. This is executed at higher speed than in the case of drawing the locus by calculating the value of the y coordinate with respect to the x coordinate one by one for each of display dots of the display 12.

After the processing at Step S7', and when it is determined at Step S5 that the command "PEN DOWN" is not effective in the script (No at S5), the process goes to the process at Step S9 to Step S13 described above. In the case of Example 2, the coordinates serving as the movement destination are (100, 100) and fall out of the display range B. For this reason, the avatar Db is not displayed through the display 12. At Step S9, the display control program 22a updates the values of the coordinates (x, y) of the avatar Db after movement to "x=100, y=100" (S9), and at step S10, the storage control subprogram 22a2 stores the updated values in the writable data area 22b (S10).

After Step S10, it is determined whether any subsequent command to be executed exists (S11). When any subsequent command exists (Yes at S11), the process proceeds to the processing to execute the subsequent command (S12). Thereafter, the process returns to Step S1. When no subsequent command exists (No at S11), execution of the script is ended, with the avatar Db kept hidden in the display 12 (S13).

The following is an explanation of operations of the electronic apparatus 10 in the case of processing the following script (Example 3). An explanation of the part similar to those in Examples 1 and 2 described above will be omitted.

Example 3

PEN DOWN
GOTO x=−100, y=−100
GOTO x=100, y=1000

In the case of Example 3, the display control subprogram 22a1 determines that the script includes a command "GOTO" (Yes at S1), and determines that the coordinates (100, 1000) serving as the movement destination of the avatar Db exceeds the display range B (No at S2) and also exceeds the operation range C, that is, the third condition is satisfied (No at S4).

When it is determined that the coordinates serving as the movement destination of the avatar Db exceeds the operation range C (No at S4), the display control program 22a determines whether the x coordinate of the movement destination of the avatar Db falls within the operation range C (S21). In the case of Example 3, because the x coordinate of the movement destination of the avatar Db is 100, it is determined that the x coordinate of the movement destination of the avatar Db falls within the operation range C (Yes at S21).

When the display control program 22a determines that the x coordinate of the movement destination of the avatar Db falls within the operation range C (Yes at S21), that is, when it is determined that the y coordinate of the movement destination of the avatar Db exceeds the operation range C, the value of the x coordinate and the value of the y coordinate are further updated as illustrated in FIG. 10. However, because the value of the y coordinate is larger than the maximum value of the operation range C, for example, the value of the y coordinate is updated to error information, such as a character string "OVER", indicating that the value exceeds the operation range C (S22), and stored in the writable data area 22b (S26). Thereafter, for example, the notification control subprogram 22a3 displays character information, such as "Range Error" as illustrated in FIG. 12, as the error picture through the display 12 (S27). Thereafter, the execution control program 22a4 ends execution of the script (S28). The details of the symbols "Press [▲][▼] →EditCommand" and "Press [AC] →ViewScript" will be described later together with operations after execution of the script is ended.

The following is an explanation of operations of the electronic apparatus 10 in the case of processing the following script (Example 4). An explanation of the part similar to those in Examples 1 to 3 described above will be omitted.

Example 4

PEN DOWN
GOTO x=−100, y=−100
GOTO x=1000, y=100

In the case of Example 4, the display control subprogram 22a1 determines that the script includes a command "GOTO" (Yes at S1), and that the coordinates (1000, 100)

serving as the movement destination of the avatar Db exceeds the display range B (No at S2) and also exceeds the operation range C (No at S4).

In addition, when it is determined that the coordinates serving as the movement destination of the avatar Db exceeds the operation range C (No at S4), the display control program 22a determines whether the x coordinate of the movement destination of the avatar Db falls within the operation range C (S21). In the case of Example 4, because the x coordinate of the movement destination of the avatar Db is 1000, it is determined that the x coordinate of the movement destination of the avatar Db falls out of the operation range C (No at S21).

Accordingly, the display control program 22a determines that the y coordinate of the movement destination of the avatar Db falls within the operation range C (Yes at S23). In addition, the value of the x coordinate and the value of the y coordinate of the movement destination of the avatar Db are updated, as illustrated in FIG. 11. However, because the value of the x coordinate is smaller than the minimum value of the operation range C, for example, the value of the x coordinate is updated to error information, such as a character string "UNDER", indicating that the value exceeds the operation range C (S24), and stored in the writable data area 22b (S26). Thereafter, the notification control subprogram 22a3 displays character information, such as "Range Error" in FIG. 12, as an error picture through the display 12 (S27). Thereafter, the execution control program 22a4 ends execution of the script (S28).

The following is an explanation of operations of the electronic apparatus 10 in the case of processing the following script (Example 5). An explanation of the part similar to those in Examples 1 to 4 described above will be omitted.

Example 5

PEN DOWN
GOTO x=−100, y=−100
GOTO x=1000, y=−1000

In the case of Example 5, the display control program 22a determines that the script includes a command "GOTO" (Yes at S1), and that the coordinates (1000, 1000) serving as the movement destination of the avatar Db exceeds the display range B (No at S2) and also exceeds the operation range C (No at S4).

Thereafter, the process proceeds to Step S21. At Step S21, the display control program 22a determines whether the x coordinate of the movement destination of the avatar Db falls within the operation range C (S21). In the case of Example 5, because the x coordinate of the movement destination of the avatar Db is 1000, it is determined that the x coordinate of the movement destination of the avatar Db falls out of the operation range C (No at S21).

Thereafter, the display control program 22a performs processing at Step S23. In the case of Example 5, because the y coordinate of the movement destination of the avatar Db falls out of the operation range C (No at S23), the display control program 22a updates the values of the coordinates to "x=OVER, y=UNDER" (S25), and stores the updated values in the writable data area 22b (S26). Thereafter, the notification control subprogram 22a3 displays character information, such as "Range Error" illustrated in FIG. 12, as an error picture through the display 12 (S27). Thereafter, the storage control subprogram 22a2 stores the updated value (OVER) of the x coordinate and the updated value (UNDER) of the y coordinate are stored in the writable data area 22b, and the execution control program 22a4 ends execution of the script (S28).

The following is an explanation of operations performed after execution of the script is ended at Step S13 and S28 described above, and operations performed after execution of the script is suspended at Step S15 described above, with reference to FIG. 5C, FIG. 5D, and FIG. 5E.

Figure 5C:
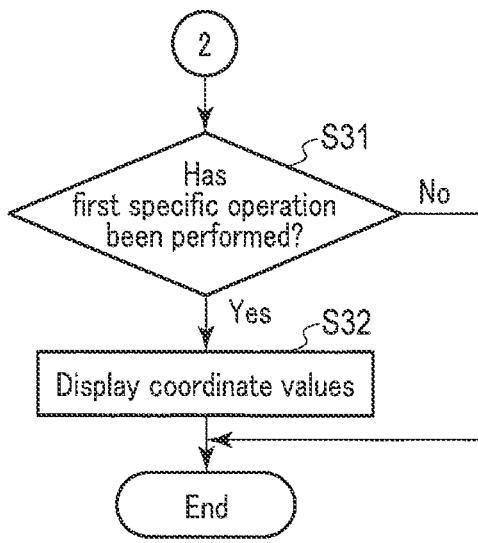
FIG. 5C is a flowchart illustrating an operation example of the electronic apparatus 10 according to the embodiment of the present invention.

FIG. 5C is a flowchart for explaining operations performed after execution of each of the scripts of (Example 1) and (Example 2) is ended. After execution of the script is ended at Step S13 described above, the display control subprogram 22a1 determines whether a first specific operation has been performed (S31). Specifically, for example, in response to successive pressing of the SHIFT key and the VARS (PRGM) key, it is determined that the first specific operation has been performed (Yes at S31), and the coordinate values stored in the writable data area 22b with the storage control subprogram 22a2 at Step S10 described above are displayed through the display 12 (S32).

Specifically, after execution of the script of (Example 1) described above is ended, when it is determined that the first specific operation has been performed (Yes at S31), the coordinate values "x=20, y=10" stored in the writable data area 22b at Step S10 described above are displayed through the display 12 (S32), as illustrated in FIG. 8.

In addition, after execution of the script of (Example 2) described above is ended, when it is determined that the first specific operation has been performed (Yes at S31), the coordinate values "x=100, y=100" stored in the writable data area 22b at Step S10 described above are displayed through the display 12 (S32), as illustrated in FIG. 9. When no first specific operation has been performed (No at S31), the processing with the execution control program 22a4 is ended.

Figure 5D:
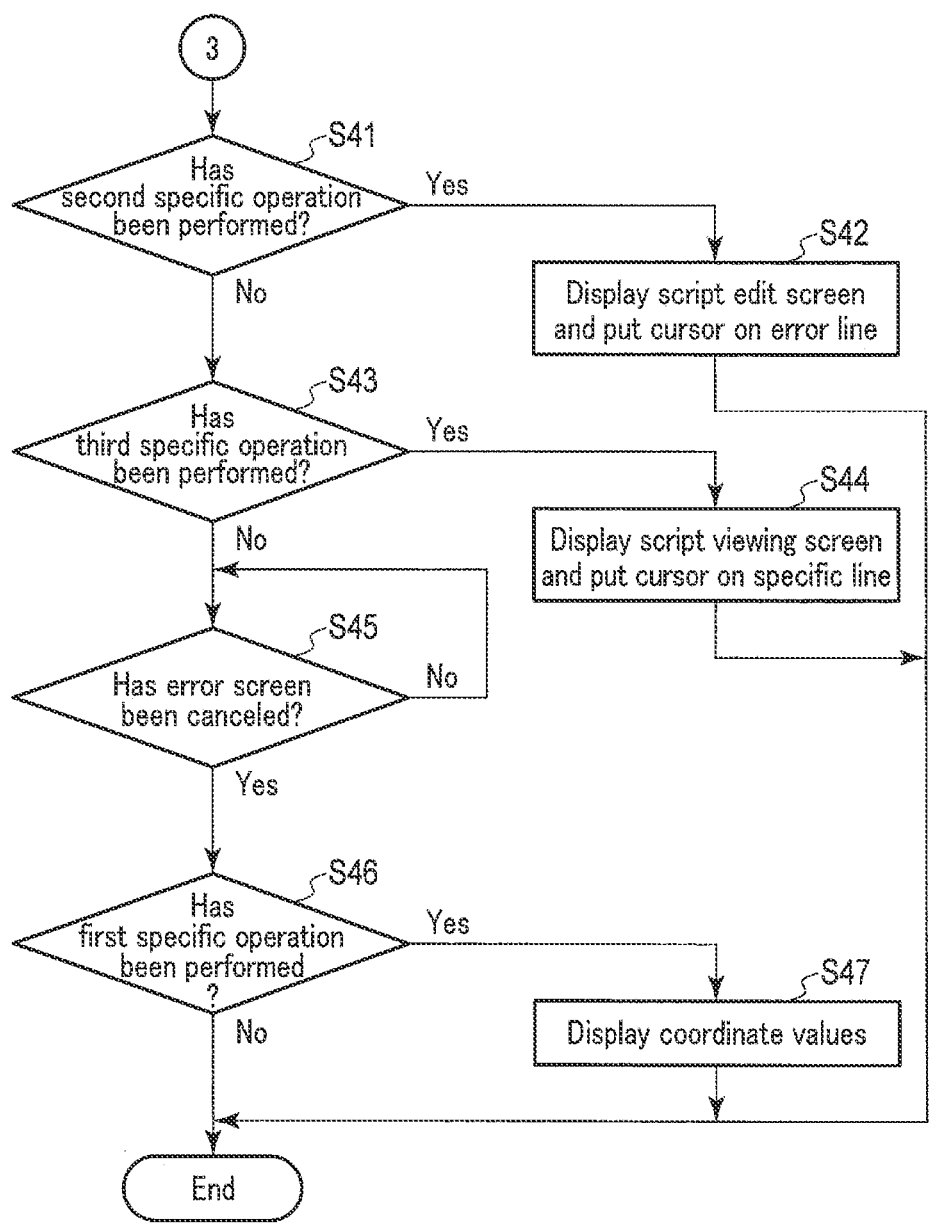
FIG. 5D is a flowchart illustrating an operation example of the electronic apparatus 10 according to the embodiment of the present invention.

FIG. 5D is a flowchart for explaining operations performed after execution of each of the scripts of (Example 3), (Example 4), and (Example 5) is ended. After execution of the script is ended at Step S28 described above, the display control subprogram 22a1 determines whether a second specific operation has been performed (S41). Specifically, for example, in response to pressing of the up cursor key [▲] or the down cursor key [▼], it is determined that the second specific operation has been performed (Yes at S41), and the displayed picture changes to a picture enabling edit of the command of the script. In this state, an edit picture Ge is displayed through the display 12 (S42). In the edit picture Ge, at least one command included in the script is displayed, and a cursor is displayed on the last command executed when execution of the script was ended, that is, the last command is selected to enable prompt edit.

FIG. 13 illustrates the edit picture Ge displayed through the display 12 when it is determined that the second specific operation has been performed (Yes at S41) after execution of the script of (Example 3) is ended. In FIG. 13, the line (line to which the command "GOTO x=100, y=1000" is input) with the background color changed to be distinguishable is the line in which the cursor is displayed, and FIG. 13 illustrates the state in which the command line is selected. The edit picture Ge receives an input operation to correct the command by the user. Thereafter, in response to reception of a predetermined operation, the processing with the execution control program 22a4 is ended.

When no second specific operation has been performed (No at S41), the display control subprogram 22a1 thereafter determines whether a third specific operation has been performed (S43). Specifically, for example, in response to pressing of the power-ON key [AC], it is determined that the third specific operation has been performed (Yes at S43), and the displayed picture changes to the picture enabling viewing of commands of the script. In this state, a viewing picture Gv is displayed through the display 12 (S44). In the viewing picture Gv, among one or more commands included in the script, at least the command of the head line is displayed, and a cursor is displayed on the command of the head line.

Figure 14:
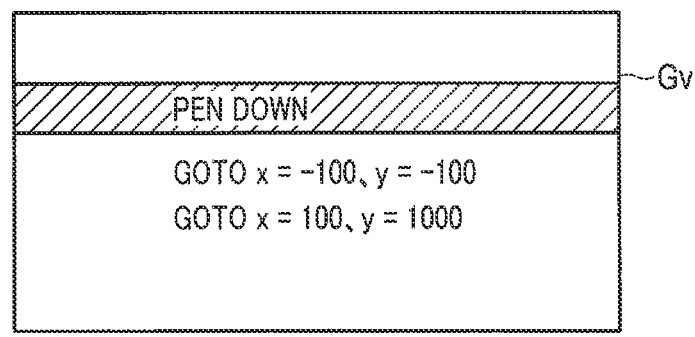
FIG. 14 is a diagram illustrating an example of a script viewing picture.

FIG. 14 illustrates the viewing picture Gv displayed through the display 12 when it is determined that the third specific operation has been performed (Yes at S43) after execution of the script of (Example 3) is ended. Also in FIG. 14, the line (line to which the command "PEN DOWN" is input) with the background color changed to be distinguishable is the line in which the cursor is displayed, and FIG. 14 illustrates the state in which the command line is selected. After the viewing picture Gv is displayed, the processing with the execution control program 22a4 is ended in response to reception of a predetermined operation. When no third specific operation has been performed (No at S43), in response to reception of a predetermined operation, the display control subprogram 22a1 thereafter determines whether the error picture displaying character information, such as "Range Error", has been canceled (S45).

When the error picture has been canceled (Yes at S45), the display control subprogram 22a1 thereafter determines whether the first specific operation has been performed (S46). Specifically, for example, in response to successive pressing of the SHIFT key and the VARS (PRGM) key, it is determined that the first specific operation has been performed (Yes at S46). The coordinate values stored in the writable data area 22b with the storage control subprogram 22a2 at Step S26 described above are displayed through the display 12.

Specifically, after execution of the script of (Example 3) described above is ended, when it is determined that the first specific operation has been performed (Yes at S31), the coordinate values "x=100, y=OVER" stored in the writable data area 22b at Step S26 described above are displayed through the display 12, as illustrated in FIG. 10.

In addition, after execution of the script of (Example 4) described above is ended, when it is determined that the first specific operation has been performed (Yes at S31), the coordinate values "x=UNDER, y=100" stored in the writable data area 22b at Step S26 described above are displayed through the display 12, as illustrated in FIG. 11.

In addition, after execution of the script of (Example 5) described above is ended, when it is determined that the first specific operation has been performed (Yes at S31), the coordinate values "x=OVER, y=UNDER" stored in the writable data area 22b at Step S26 described above are displayed through the display 12, although not illustrated. When no first specific operation has been performed (No at S46), the processing with the execution control program 22a4 is ended.

Figure 5E:
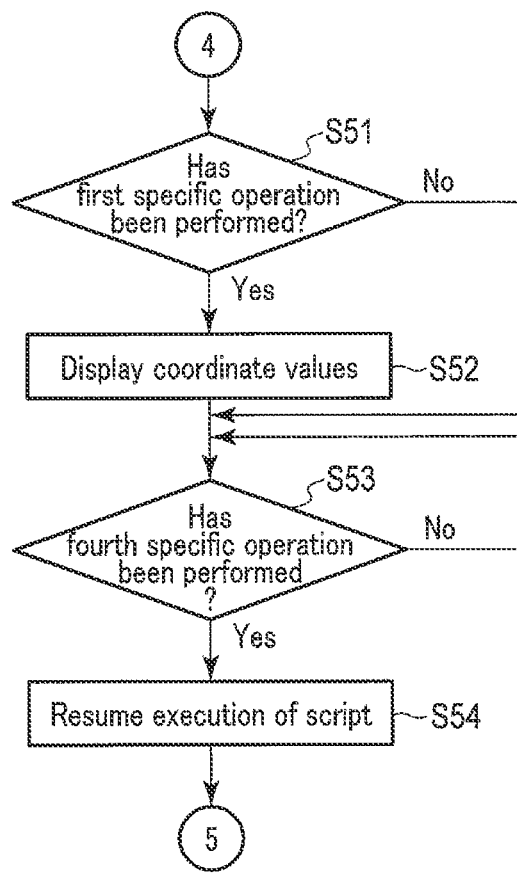
FIG. 5E is a flowchart illustrating an operation example of the electronic apparatus 10 according to the embodiment of the present invention.

FIG. 5E is a flowchart for explaining operations performed after execution of the script is suspended by execution of the command "WAIT" during execution of the script. This example illustrates operations performed after execution of the script is suspended in the case of the script (Example 6) illustrated below.

Example 6

PEN DOWN
GOTO x=10, y=10
WAIT
MOVE (10)
PEN UP

In the script described above, after the command "GOTO" in the second line is executed, the display control program 22a updates the values of the coordinates (x, y) of the avatar Db after movement to the values "x=10, y=10" (S9), and the storage control subprogram 22a2 stores the updated values in the writable data area 22b (S10). Thereafter, when the command "WAIT" in the third line is executed, it is determined that the command is the command "WAIT" (Yes at S14), and execution of the script is suspended (S15).

Figure 15:
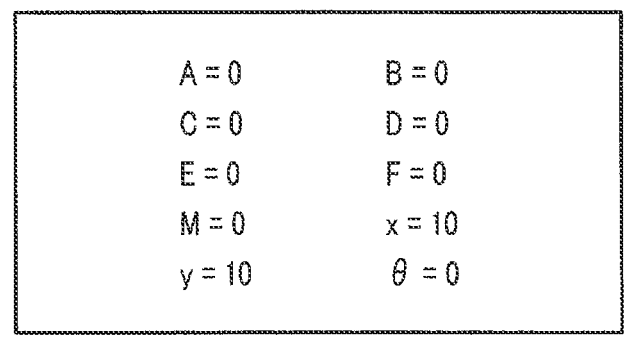
FIG. 15 is a schematic diagram illustrating another example of parameters updated in accordance with the coordinate values after movement of the avatar.

After execution of the script is suspended at Step S15 described above, the display control subprogram 22a1 determines whether the first specific operation has been performed (S51). Specifically, for example, in response to successive pressing of the SHIFT key and the VARS (PRGM) key, it is determined that the first specific operation has been performed (Yes at S51). As illustrated in FIG. 15, the coordinate values "x=10, y=10" stored in the writable data area 22b with the storage control subprogram 22a2 at Step S10 described above are displayed through the display 12 (S52).

After the coordinate values are displayed through the display 12, or when no first specific operation has been performed at Step S51 (No at Step S51), the execution control program 22a4 thereafter executes processing at Step S53. At Step S53, the display control subprogram 22a1 determines whether a fourth specific operation has been performed (S53). Specifically, for example, in response to pressing of the EXE key, it is determined that the fourth specific operation has been performed (Yes at S53), execution of the script is resumed (S54), and it is determined whether any subsequent command to be executed exists (S11). The processes at and after Step S11 have been described above, and an explanation thereof is omitted.

The following is an explanation of advantageous effects produced with the electronic apparatus 10 provided with the display control apparatus to which the display control method is applied according to the embodiment of the present invention as described above.

The display 12 of a graph function electronic calculator is generally narrow. For this reason, when the user, such as a student, prepares and executes a script to move the avatar Db using parameters as in the exercises of the textbook, the avatar Db may exceed the display range B.

With the electronic apparatus 10 provided with the display control apparatus to which the display control method is applied according to the embodiment of the present invention, however, the display range B and the operation range C are considered. With this structure, even when the coordinates of the movement destination of the avatar Db falls out of the display range B of the display 12, the locus of the avatar Db can be displayed as long as it falls within the operation range C and can be displayed through the display 12. In addition, this structure enables storage of the values of the coordinates after movement.

This structure enables the user to check how the avatar Db moves, even when the user executes the script to move the avatar Db to the outside of the display range of the display 12.

In addition, although the locus of the avatar Db is not displayed in the case where the movement destination of the avatar Db also exceeds the operation range C, this structure enables storing of values indicating the coordinates of the movement destination of the avatar Db, such as characters like "OVER" and "UNDER" indicating overflow, and display of character information, such as "Range Error", as the error picture through the display 12. This structure enables the user to recognize the reason why the locus of the avatar Db is not displayed.

As described above, the electronic apparatus 10 equipped with the display control apparatus to which the display control method is applied according to the embodiment of the present invention enables contribution to achievement of user's efficient learning of the algorithm.

In the electronic apparatus 10 equipped with the display control apparatus to which the display control method is applied according to the embodiment of the present invention, the locus of the avatar Db is displayed through the display 12 by connecting two points of the start point coordinates and the end point coordinates with a straight line. This structure enables execution of display of the locus at higher speed than that in the case of drawing the locus while calculating the value of the y coordinate with respect to the x coordinate one by one.

The present invention is not limited to each embodiment, but various modifications are possible in implementation thereof within the range not departing from the gist thereof. In addition, each embodiment includes inventions of various stages, and various inventions can be extracted by proper combinations of a plurality of disclosed constituent elements. For example, even when some constituent elements are deleted from the constituent elements illustrated in each embodiment or some constituent elements are used in combination in various forms, the structure in which the constituent elements are deleted or used in combination may be extracted as an invention, when the problem stated in the problem to be solved is solved and the effect stated in the effects of the invention is obtained.

What is claimed is:

1. A display control apparatus comprising:
a controller configured to control a display to:
  display, when a first condition is satisfied, a figure determined based on first coordinates and second coordinates, the second coordinates being determined based on one or more commands set by a user, the first condition being satisfied when the first coordinates and the second coordinates belong to a first range defined with coordinate values of a coordinate system displayed on the display; and
  display, when a second condition is satisfied, a part of the figure belonging to the first range, the second condition being satisfied when either one of the first coordinates or the second coordinates does not belong to the first range but belongs to a second range including the first range and the other belongs to the first range.

2. The display control apparatus according to claim 1, wherein the controller is configured to:
  when the first condition is satisfied, display the figure determined based on the first coordinates and the second coordinates on the display, store the second coordinates in a storage, and continue execution of commands equal or subsequent to the one or more commands; and
  when the second condition is satisfied, display the part of the figure belonging to the first range, store the second coordinates in the storage, and continue execution of commands equal or subsequent to the one or more commands.

3. The display control apparatus according to claim 2, wherein the controller is further configured to perform control to notify from a notification unit that the second coordinates satisfy a third condition, and suspend execution of commands equal or subsequent to the one or more commands, when the second coordinates satisfy the third condition that the second coordinates do not belong to the second range defined with the coordinate values of the coordinate system.

4. The display control apparatus according to claim 3, wherein the controller changes processing to a state enabling edit of the command leading to satisfaction of the third condition by execution of the command, in response to reception of a first operation during suspension of the execution, and displays a head command in the one or more commands on the display, in response to reception of a second operation different from the first operation during suspension of the execution.

5. The display control apparatus according to claim 4, wherein the controller stores information indicating that the third condition is satisfied in the storage, when the third condition is satisfied, and displays, on the display, the information that the third condition is satisfied in information items stored in the storage, in response to reception of a specific operation.

6. The display control apparatus according to claim 5, wherein the controller, when the third condition is satisfied, stores information indicating that the third condition is satisfied in the storage, distinguishing a case where the second coordinates fall out of the second range to an outside range larger than a maximum value of the second range from a case where the second coordinates fall out of the second range to an outside range smaller than a minimum value of the second range, and displays the information on the display such that the case where the second coordinates fall out of the range to the outside range larger than the maximum value of the second range is distinguishable from the case where the second coordinates fall out of the range to the outside range smaller than the minimum value of the second range, in the information items stored in the storage, in response to reception of the specific operation.

7. The display control apparatus according to claim 5, wherein
  the second coordinates include a first value and a second value,
  when the third condition is satisfied, the controller stores information indicating that the third condition is satisfied in the storage, distinguishing a case where the first value falls out of the second range from a case where the second value falls out of the second range, and displays the information on the display such that the case where the first value falls out of the second range is distinguishable from the case where the second value falls out of the second range, in the information items stored in the storage, in response to reception of the specific operation.

8. The display control apparatus according to claim 3, wherein the controller stores information indicating that the third condition is satisfied in the storage, when the third condition is satisfied, and displays, on the display, the information that the third condition is satisfied in information items stored in the storage, in response to reception of a specific operation.

9. The display control apparatus according to claim 8, wherein the controller, when the third condition is satisfied, stores information indicating that the third condition is satisfied in the storage, distinguishing a case where the second coordinates fall out of the second range to an outside range larger than a maximum value of the second range from a case where the second coordinates fall out of the second range to an outside range smaller than a minimum value of the second range, and displays the information on the display such that the case where the second coordinates fall out of the range to the outside range larger than the maximum value of the second range is distinguishable from the case where the second coordinates fall out of the range to the outside range smaller than the minimum value of the second range, in the information items stored in the storage, in response to reception of the specific operation.

10. The display control apparatus according to claim 8, wherein the second coordinates include a first value and a second value, when the third condition is satisfied, the controller stores information indicating that the third condition is satisfied in the storage, distinguishing a case where the first value falls out of the second range from a case where the second value falls out of the second range, and displays the information on the display such that the case where the first value falls out of the second range is distinguishable from the case where the second value falls out of the second range, in the information items stored in the storage, in response to reception of the specific operation.

11. The display control apparatus according to claim 1, wherein the figure determined based on the first coordinates and the second coordinates is a straight line connecting the first coordinates and the second coordinates.

12. The display control apparatus according to claim 1, wherein the controller configured to control a display to:

display, when a second condition is satisfied, a part of the figure belonging to the first range determined based on the first coordinates and second coordinates, the second condition being satisfied when both the first coordinates and the second coordinates do not belong to the first range but belong to the second range and when the first range is positioned between the first coordinates and the second coordinates.

13. A method performed by a processor for controlling a display of a display control apparatus, the method comprising:

displaying, when a first condition is satisfied, a figure determined based on first coordinates and second coordinates, the second coordinates being determined based on one or more commands set by a user, the first condition being satisfied when the first coordinates and the second coordinates belong to a first range defined with coordinate values of a coordinate system displayed on the display, storing the second coordinates in a storage, and continuing execution of commands equal or subsequent to the one or more commands; and displaying, when a second condition is satisfied, a part of the figure belonging to the first range, the second condition being satisfied when either one of the first coordinates or the second coordinates does not belong to the first range but belongs to a second range including the first range and the other belongs to the first range, storing the second coordinates in the storage, and continuing execution of commands equal or subsequent to the one or more commands.

14. A non-transitory recording medium having a program recorded thereon that is executable to control a computer to:

display, when a first condition is satisfied, a figure determined based on first coordinates and second coordinates, the second coordinates being determined based on one or more commands set by a user, the first condition being satisfied when the first coordinates and the second coordinates belong to a first range defined with coordinate values of a coordinate system displayed on the display, store the second coordinates in a storage, and continue execution of commands equal or subsequent to the one or more commands; and display, when a second condition is satisfied, a part of the figure belonging to the first range, the second condition being satisfied when either one of the first coordinates or the second coordinates does not belong to the first range but belongs to a second range including the first range and the other belongs to the first range, store the second coordinates in the storage, and continue execution of commands equal or subsequent to the one or more commands.

\* \* \* \* \*